United States Patent
Denis et al.

(10) Patent No.: US 11,261,310 B2
(45) Date of Patent: Mar. 1, 2022

(54) METHOD FOR TREATING POLYVINYL BUTYRAL (PVB)

(71) Applicants: INSTITUT NATIONAL POLYTECHNIQUE DE TOULOUSE, Toulouse (FR); CENTRE NATIONAL DE LA RECHERCHE SCIENTIFIQUE—CNRS, Paris (FR)

(72) Inventors: Ghislain Denis, Calmont (FR); Jean-Luc Trompette, Toulouse (FR); Michel Delmas, Auzeville Tolosane (FR)

(73) Assignee: INSTITUT NATIONAL POLYTECHNIQUE DE TOULOUSE, Paris (FR)

( * ) Notice: Subject to any disclaimer, the term of this patent is extended or adjusted under 35 U.S.C. 154(b) by 0 days.

(21) Appl. No.: 16/977,304

(22) PCT Filed: Mar. 1, 2019

(86) PCT No.: PCT/FR2019/050472
§ 371 (c)(1),
(2) Date: Sep. 1, 2020

(87) PCT Pub. No.: WO2019/166747
PCT Pub. Date: Sep. 6, 2019

(65) Prior Publication Data
US 2021/0002451 A1    Jan. 7, 2021

(30) Foreign Application Priority Data
Mar. 2, 2018  (FR) ...................................... 18 51839

(51) Int. Cl.
*C08J 11/06*  (2006.01)
(52) U.S. Cl.
CPC ............ *C08J 11/06* (2013.01); *C08J 2361/00* (2013.01)
(58) Field of Classification Search
None
See application file for complete search history.

(56) References Cited

U.S. PATENT DOCUMENTS

| | | | |
|---|---|---|---|
| 2006/0144515 A1* | 7/2006 | Tada | C08J 11/04 156/706 |
| 2013/0276284 A1* | 10/2013 | Brosseau | C22B 11/046 29/426.1 |

FOREIGN PATENT DOCUMENTS

| | | |
|---|---|---|
| CN | 102993456 A | 3/2013 |
| DE | 4213450 C1 | 4/1992 |
| DE | 19509244 C1 | 11/1996 |
| DE | 19811199 A1 | 9/1999 |
| DE | 10301738 A1 | 7/2004 |
| EP | 1619227 A1 | 1/2006 |
| JP | 2016050199 A | 4/2016 |
| KR | 20140122452 A | 10/2014 |
| KR | 20160099305 A | 8/2016 |
| KR | 20160099306 A | 8/2016 |
| KR | 101742493 * | 1/2017 |
| KR | 101742493 B1 | 6/2017 |
| RO | 128912 B1 | 10/2015 |
| TW | 201350334 A | 12/2013 |
| WO | 9705197 A1 | 2/1997 |
| WO | 2011130622 A1 | 10/2011 |

OTHER PUBLICATIONS

Machine translation of KR101742493, Kim (Year: 2017).*

* cited by examiner

*Primary Examiner* — Frances Tischler
(74) *Attorney, Agent, or Firm* — WC&F IP

(57) ABSTRACT

The present invention relates to a method for treating fragments of polyvinyl butyral (PVB) in which glass shards are encrusted in or on the surface of the PVB. The method involves placing PVB fragments in contact with an aqueous solution comprising a cationic surfactant and a weak base, to obtain a mixture. This mixture, subjected to ultrasound within a defined temperature range, leads to separation of the glass shards and the PVB.

In particular, the inventors have discovered that the combined, simultaneous, and complementary action of a weak base, a cationic surfactant, and ultrasound, at an appropriate temperature, made it possible to detach and/or unembed the glass shards fixed to the collected PVB without degrading the polymer matrix.

20 Claims, 2 Drawing Sheets

METHOD FOR TREATING POLYVINYL BUTYRAL (PVB)

FIELD OF THE INVENTION

The present invention relates to a method for treating fragments of polyvinyl butyral (PVB).

"Fragments of PVB" is understood to mean a product comprising a sheet of PVB with glass shards encrusted therein or thereon.

More particularly, the present invention relates to a method for extracting glass shards which have remained encrusted in or on the surface of the PVB during the operations of crushing and grinding laminated glass.

"Laminated glass" is understood to mean a product consisting of two or more layers of glass separated from one another by a sheet of polyvinyl butyral (PVB) preferably containing at least one plasticizer; by their adhesion to the glass, the sheets of PVB prevent the glazing from shattering in the event of breakage.

Among other uses, PVB is used in the automotive industry for the production of windshields and in the construction and building sector for insulating and burglar-resistant glazing.

It is therefore recovered in parallel with the glass after discarded windows are crushed and ground.

The PVB recovered during deconstruction of vehicles but also from teardown and removal work in the construction and building sectors, represents, in European countries including France, an annual stream of several tens of thousands of tons. Contaminated with glass, there is little recycling of it currently. In effect, the residual glass content adhering to the surface of the PVB sheets remains too high, tens of grams per $m^2$ of PVB, thus drastically limiting the possibilities for its reuse in applications with high added value.

Recovered PVB is therefore at best incorporated into the low-end plastics industry, burned in suitable boilers, or even simply landfilled.

However, obtaining recycled PVB free of impurities would have the following consequences:
- enable its reuse, thus replacing the use of new PVB which costs from 10 to 15 euros/kg, in the production of laminated glazing; recycled PVB representing a source of substantial savings for the consuming industries,
- avoid sending laminated glass to the landfill,
- recycle carbon, saving raw materials as well as the energy necessary for PVB synthesis, 1 ton of recycled PVB corresponding to approximately 2 tons of $CO_2$ saved (REVS Project—The 3rd Industrial Revolution in Hauts de France, November 2017),
- help achieve the recycling percentage goal for vehicles that will be imposed on motor vehicle manufacturers in the near future.

PRIOR ART

Currently, several ways of treating and purifying PVB are proposed: treatment by melting the polymer, treatment with organic solvents, and treatment in aqueous solution.

The melting method consists of melting the PVB to be recycled by bringing it to a temperature below the degradation temperature of the polymer, then retaining the glass fragments on a filter (TW 201350334). However, this process has the disadvantage of altering the physical properties of the polymer.

It has also been proposed to treat the PVB to be recycled in a hot autoclave with supercritical $CO_2$, thus requiring the availability of an expensive and elaborate setup (WO 9705194 A1).

Another method consists of dissolving the PVB to be recycled in an organic solvent under heat and pressure and then filtering the obtained solution to retain the glass particles (DE 19811199, CN 102993456 A, KR 20140122452 A). However, the solvents used are all flammable, harmful, and involve heat treatment.

In order to attempt to remedy the above disadvantages, methods in aqueous media have been proposed.

One method consists of immersing the PVB in a strong base solution (DE 4213450 C1, WO 9902460 A1) or in an acid solution (WO 9902460 A1). However, the use of strong bases such as soda or potash alters the chemical structure of the polymer, by saponification of the acetate groups, as well as its mechanical properties. Similarly, the use of acids leads to alteration of the polymer chain.

Patents EP 2308919 A1 and RO 128912 B1 describe a method for treating PVB in an acidic medium then in a basic medium. However, after treatment, the PVB is impregnated with acid and the glass content remains too high.

Another method consists of treating the PVB by stirring at high temperature in the presence of alcoholates (DE 10301738 A1). However, the use of strong bases such as alcoholates alters the structure of PVB. In addition, successive immersion of pieces of PVB in alcoholate baths at different temperatures is necessary, thus complicating the treatment method.

A technique of physical separation in an aqueous medium in the presence of a nonionic surfactant (KR 20160099306 A, KR 20160099305 A) has also been proposed. However, the use of such surfactants does not allow obtaining satisfactory results. In particular, a demixing phenomenon (cloud point) is observed when using aqueous solutions of nonionic surfactants brought to temperatures above 45° C.

Besides the problem of polymer alteration, it is important to minimize the residual glass content after treatment.

The proportion of glass remaining after treatment is only very rarely mentioned in the available documents. Patent RO 128912 B1, in which the PVB is treated in an acidic medium then in a basic medium, states a final purity of 99%, which is a residue of 10 g of impurity (or impurities) per kilogram of finished product. DE 19509244 C1, in which there is an addition of surfactants, mentions a residual glass content of 0.012 kg per 100 kg of PVB or 0.012%, in other words 0.12 g per kilogram.

EP 1 619 227 A1 describes a method for separating laminate glass in which surfactants of all types are used as simple wetting agents. However, EP 1 619 227 A1 does not describe the specific combination of weak base, cationic surfactant, ultrasound, and temperature.

WO 2011/130622 A1 relates to a method for recycling printed circuit boards. This method does not concern the separation of glass and PVB. In addition, the surfactants are used optionally therein in the treatment of metals, and more particularly for leaching.

It therefore emerges from the foregoing that none of the techniques currently proposed make it possible to obtain a finished product of high quality, i.e. a product with a high degree of purity, without altering the chemical structure of PVB or its mechanical properties, while minimizing the costs and environmental impact related to the recycling of PVB.

However, the present inventors have developed a method for treating PVB which provides an excellent compromise between these various criteria.

In particular, the present inventors have discovered that the combined, simultaneous, and complementary action of a weak base, a cationic surfactant, and ultrasound, at an appropriate temperature, made it possible to detach and/or unembed the glass shards fixed to the collected PVB without degrading the matrix of the polymer or its mechanical properties.

SUMMARY OF THE INVENTION

The invention therefore relates to a method for treating fragments of polyvinyl butyral (PVB) having glass shards in or on the surface of the PVB, the method comprising the following steps:
 bringing the PVB fragments into contact with an aqueous solution comprising a cationic surfactant and a weak base, to obtain a mixture,
 subjecting said mixture to ultrasound, and
 separating the glass shards and the PVB.

DETAILED DESCRIPTION

The invention relates to a method for treating fragments of polyvinyl butyral (PVB) having glass shards in or on the surface of the PVB, the method comprising the following steps:
 bringing the PVB fragments into contact with an aqueous solution comprising a cationic surfactant and a weak base, to obtain a mixture,
 subjecting said mixture to ultrasound, and
 separating the glass shards and the PVB.

The method involves bringing the PVB fragments into contact with an aqueous solution, said aqueous solution comprising a cationic surfactant and a weak base in order to obtain a mixture.

Once subjected to ultrasound within a defined temperature range, this leads to the separation of the glass shards and the PVB.

More particularly, the present invention relates to a method for extracting glass shards which remain encrusted in or on the surface of the PVB during the operations of crushing and grinding laminated glass.

"Laminated glass" is understood to mean a product consisting of two or more layers of glass separated from one another by a sheet of polyvinyl butyral (PVB) preferably containing at least one plasticizer; by their adhesion to the glass, the sheets of PVB prevent the glazing from shattering in the event of breakage.

Advantageously, said at least one plasticizer is chosen from the group consisting of the esters of heptanoic acid with triethylene glycol or tetraethylene glycol.

"Separation" of the glass and the PVB is understood to mean the detachment of the glass shards from the PVB.

Glass is understood to mean any type of non-composite glass, whether it is drawn, cast, tinted, transparent, translucent or opaque, etched, or treated in any other way.

When preparing the aqueous solution, the weak base may be added before or after the cationic surfactant, and preferably before. In the case where the weak base is added after the cationic surfactant, the method according to the invention may comprise a heating step.

Those skilled in the art will be able to choose the appropriate heating temperature to dissolve the cationic surfactant and avoid its degradation.

Advantageously, the aqueous solution is heated to between 30 and 50° C., preferably between 35 and 45° C., and even more preferably to around 40° C.

Advantageously, the temperature of the mixture subjected to ultrasound is between 40 and 70° C., preferably between 45 and 65° C., more preferably between 50 and 60° C., and even more preferably between 55 and 58° C.

Advantageously, the temperature of the mixture subjected to ultrasound is chosen specifically so as to:
 reduce evaporation of the aqueous solution during the treatment so as to maintain a constant ratio of [mass of PVB to be treated/volume of solution], thus preserving the efficiency of the method,
 reduce as much as possible the surface tensions at the interfaces concerned, i.e. glass/water and PVP/water interfaces, and
 increase the kinetics of attack on the surface of the glass by the weak base.

When the temperature of the mixture subjected to ultrasound is less than 40° C., the surface tensions at the interfaces concerned are not sufficiently lowered and the kinetics of attack on the surface of the glass by the weak base are not sufficiently high to obtain good separation of the glass and the PVB.

When the temperature of the mixture subjected to ultrasound is above 70° C., significant evaporation of the aqueous solution impairs the efficiency of the separation method and of the cavitation process.

Advantageously, the weak base has the following general formula:

$$M_2CO_3, \qquad \text{Formula (I):}$$

where M represents an alkali metal.

Advantageously, said weak base is chosen among potassium carbonate or sodium carbonate.

The weak bases of the present invention are ECOCERT certified, do not damage the materials and equipment used for the method, and do not pose any particular danger to their user.

Thus, the weak base of the present invention makes it possible to weaken the structure of the glass shards at the surface, thus reducing their adhesion to the polymer without degrading said polymer. More particularly, in an alkaline medium, the glass is attacked more at the surface when the temperature increases.

Advantageously, said aqueous solution comprising a cationic surfactant and a weak base has a basic pH of between 8 and 14, preferably between 11 and 13, and even more preferably approximately equal to 12.

Those skilled in the art will be able to choose the appropriate amount of base in order to obtain a basic pH between 8 and 14, preferably between 11 and 13, and even more preferably approximately equal to 12.

Typically, the aqueous solution comprises between 3 and 10% by mass, preferably between 4 and 8% by mass, and even more preferably between 5 and 7% by mass, of weak base relative to the total mass of said aqueous solution.

Advantageously, the cationic surfactant is chosen from the quaternary ammonium halide salts.

Advantageously, the cationic surfactant is a quaternary ammonium halide salt corresponding to the following general formula (II):

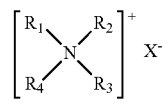

where $R_1$ to $R_3$ each represent a methyl group, $R_4$ represents a linear or branched alkyl chain, preferably linear, comprising between 8 and 30, preferably between 10 and 24 and even more preferably between 10 and 18 carbon atoms, and where X represents a halide.

"Halide" is understood to mean fluoride, chloride, bromide, and iodide, preferably chloride and bromide.

Advantageously, the cationic surfactant has an HLB of between 20 and 25.

Preferably, the surfactant is a cetyltrimethylammonium halide of formula $(C_{16}H_{33})N(CH_3)_3X$, where X represents a halide.

The surfactants of the present invention are used in cosmetics, and their use is not dangerous.

Those skilled in the art will be able to choose the appropriate amount of cationic surfactant to obtain the critical micelle concentration at the treatment temperature.

Typically, the aqueous solution comprises between 0.03 and 0.4% by mass, preferably between 0.04 and 0.3% by mass, and even more preferably between 0.05 and 0.2% by mass, of cationic surfactant relative to the total mass of said aqueous solution.

In the present invention, the role of the surfactants goes beyond the wetting effect inherent in any surfactant. The term "wetting effect" is understood to mean the reduction in the surface tension of the solution thus facilitating contact of the solution with the support to be treated.

When the solution of cationic surfactant is used in contact with the PVB fragments on which glass shards are encrusted, not only is the wetting effect facilitated but also molecules of cationic surfactant are adsorbed specifically via their polar heads on the glass shards and others adsorb to the hydrophobic surface of PVB via their alkyl chains. These concomitant adsorptions of surfactants are responsible for the reduction in corresponding surface tensions, i.e. glass/water and PVB/water, thus reducing the adhesion of the glass shards to the PVB and facilitating their detachment.

In particular, the glass shards, which are essentially composed of silica, acquire a negative surface charge on contact with the aqueous solution at the basic pH used. Due to its cationic nature, the surfactant of the present invention has a positively charged polar head which enables its adsorption by electrostatic attraction at the negatively charged active sites on the surface of the glass shards. At the same time, cationic surfactants can adsorb to the surface of the PVB via their alkyl chain (hydrophobic). This adsorption of surfactants at the interfaces concerned, combined with the destabilizing effect of the weak base, leads to a decrease in the adhesion energy of the glass shards to the PVB. These phenomena are reinforced at higher temperature where the surface tensions are further reduced.

The aqueous solution of the present invention does not contain any aggressive, toxic, flammable, or environmentally hazardous compounds.

In particular, the method according to the invention does not involve toxic or flammable organic solvents, nor significantly corrosive mineral substances such as strong bases or strong acids.

The method according to the invention is implemented in an aqueous medium at atmospheric pressure and at moderate temperature, thus making it possible to avoid the formation of gases or vapors, and does so with standardized equipment commonly used in industry, complying with the standards in force in France and in the EU. The implementation of the method according to the invention at atmospheric pressure and under mild conditions does not require any technologically complex or excessively elaborate setup and is therefore inexpensive.

The mixture of PVB fragments, cationic surfactant, and weak base is stirred mechanically while being subjected to ultrasound. Ultrasound is generated in situ so as to create cavitation waves in the solution which contribute to detaching the glass shards more easily upon their impact with the PVB.

Advantageously, the ultrasound is applied at a frequency ranging from 20 to 100 kHz, preferably from 35 to 90 kHz, and even more preferably from 37 to 80 kHz.

Advantageously, the ultrasound is applied for a duration ranging from 0.5 to 4 hours, preferably from 0.8 to 2.5 hours, and even more preferably from 1 to 2 hours.

Ultrasound weakens the glass-polymer bonds and accentuates the attack by the base on the surface of the glass.

In particular, ultrasound makes it possible to generate cavitation microbubbles of a size comparable to that of the glass shards to be detached from the surface. The ultrasonic wave, propagating in the bath, causes sequences of overpressure/underpressure which cause the formation of microbubbles responsible for cavitation. The cavitation bubbles grow cyclically to a critical size before imploding. During the implosion, where the local pressure and temperature may be very high, the radial jet of vapor contained inside them approaches speeds of about 100 meters per second, causing a major detaching effect for the glass shards. The size of the bubbles is related to the ultrasonic frequency: about 10 microns for an ultrasonic frequency of around thirty kHz, a few microns for an ultrasonic frequency of around a hundred kHz. The detachment of the glass shards from the PVB by the ultrasonic method is only effective with a cationic surfactant and in a basic medium as defined above.

In addition, in the method according to the invention, the mixture is subjected to mechanical stirring using a stirrer, preferably using a paddle. Mechanical stirring of the medium helps to prevent the sheets of PVB in the aqueous solution from sticking to each other.

The method according to the invention therefore involves a set of both physical and chemical phenomena which make it possible to obtain good separation between the glass shards and the PVB within a defined temperature range:

the weak base makes it possible to weaken the surface of the glass shards, facilitating separation, the surfactant facilitates the suspension of the glass shards, and the ultrasound weakens the glass-polymer bonds and accentuates the attack by the base on the glass at the surface.

It is therefore the combined, simultaneous, and complementary action of the weak base, the cationic surfactant, the ultrasound, and the temperature as defined above which makes it possible to best detach and/or unembed the glass shards fixed to the PVB.

Advantageously, the residual glass content is less than 100 $mg/m^2$ of PVB, preferably less than 50 $mg/m^2$ of PVB, and even more preferably less than 30 $mg/m^2$ of PVB. The residual glass content of PVB after treatment is thus very low.

This residual glass content is measured by counting the glass shards under an optical microscope and measuring the silicon content with an EDX probe.

Advantageously, the purity of the PVB after treatment is evaluated by scanning electron microscopy, differential scanning calorimetry, X-ray fluorescence, and/or Fourier transform infrared spectroscopy FTIR.

Advantageously, the method according to the invention further comprises a step of separating:

a) said aqueous solution comprising a cationic surfactant and a weak base,
b) the glass shards, and
c) the PVB.

Advantageously, the separation step is carried out by filtration, sedimentation, decantation, or centrifugation, preferably by sedimentation.

Advantageously, after sedimentation, the PVB chips are recovered directly.

Advantageously, the method according to the invention further comprises a step of rinsing with water and air drying.

The negligible consumption of the compounds used for treating the PVB fragments makes it possible to reuse the aqueous solution after purifying it (by filtration or centrifugation or sedimentation) to remove the previously detached glass shards. In the case of filtration, this can be carried out continuously during treatment by the action of a pump through a filter while recirculating the reaction medium outside the bath subjected to ultrasound.

The inventors of the present invention have discovered that only the combined, simultaneous, and complementary action of a weak base, a cationic surfactant, and ultrasound, at an appropriate temperature, has made it possible to detach and/or unembed the glass shards fixed on the PVB without degrading the polymer matrix or its mechanical properties.

It is unquestionably the combination of the four factors working together that produces a significant effect in terms of extracting/detaching the glass shards from the surface of the PVB.

The method of the present invention thus obtains a separation between the glass shards and the PVB. This method does not cause a chemical reaction between the aqueous solution and the PVB.

In summary, the PVB and glass shards are separated and the structure of the PVB is not altered by this aqueous solution. In the field of health and safety, there are no concerns about releasing fumes into the ambient environment. The treatment is therefore carried out in a more or less closed circuit. Water consumption is very low.

In conclusion, the method according to the invention makes it possible to obtain, after treatment, a finished product of high quality, i.e. a product with a high degree of purity, in which the chemical structure and the mechanical properties of PVB are not altered, while minimizing the costs and the environmental impact related to PVB recycling.

It is to be understood that the invention is in no way limited to the embodiment indicated above and that many modifications can be made thereto without departing from the scope of the appended claims.

The invention will now be illustrated by the following non-limiting examples.

EXAMPLES

Test Protocols

Measuring the Residual Glass Content of the PVB After Treatment

1. Optical Microscopy

The treated PVB samples are examined using a MEOPTA CZ optical microscope at ×200 magnification. The number of glass particles (shards) which are present in the visual field of 1 mm$^2$ (graduated scale of the eyepiece) is evaluated. This count, carried out in ten different fields, allows determining the average number of glass shards per m$^2$. The average volume of the particles is estimated using this graduated scale. The product of the average volume times the number of particles times the density of the glass (2.5 g/cm$^3$) gives the mass of residual glass per m$^2$.

2. Energy Dispersive X-Ray Spectroscopy (EDX or EDS)

A spectrometer coupled with a scanning electron microscope (SEM) makes it possible to obtain the chemical nature of the elements on the surface of the sample as well as their quantification. The X-radiation emitted by silicon Si (component of glass $SiO_2$) at its characteristic wavelength is captured by the detector of the spectrometer then is processed by the software for which the database, including the response coefficient of the X-ray of silicon, leads to its quantification.

Measuring PVB Purity After Treatment

1. Fourier Transform Infrared Spectroscopy (FTIR)

Measurements are performed using a Fourier transform infrared microscope (Spectrum Spotlight 300, Perkin Elmer). The spectra obtained are recorded and compared to a database containing approximately 50,000 spectra of organic, organometallic, and mineral products, for identification purposes.

2. Differential Scanning Calorimetry (DSC)

This technique consists of measuring the difference between the heat flows which enter a sample crucible and enter a reference crucible, as a function of the temperature, these two crucibles being subjected to a predefined temperature program in a specified atmosphere. It allows determining the heats of reaction, the glass transition temperatures, and the melting temperatures.

The reference crucible is an empty aluminum 40 µl crucible, its lid being pierced with a hole.

About 10 mg of the sample are weighed in an identical crucible. The measurements are carried out using a Mettler DSC 3+, under a nitrogen atmosphere.

Method of analysis:
heat from 25 to 250° C. at 10° C./min under an inert atmosphere (nitrogen) at a flow rate of 200 ml/min,
hold for 2 minutes at 250° C.,
cool from 250 to −70° C. at 10° C./min under nitrogen at a flow rate of 200 ml/min,
hold for 5 minutes at −70° C.,
heat from −70 to 250° C. at 10° C./min under an inert atmosphere (nitrogen) at a flow rate of 200 ml/min.

3. X-Ray Fluorescence

The sample is metallized with gold before being analyzed by fluorescence using a scanning electron microscope (SEM), LEO 1455 VP brand, to which an OXFORD EDX analysis probe (energy dispersion) is coupled.

EXAMPLE 1

Figure 1:
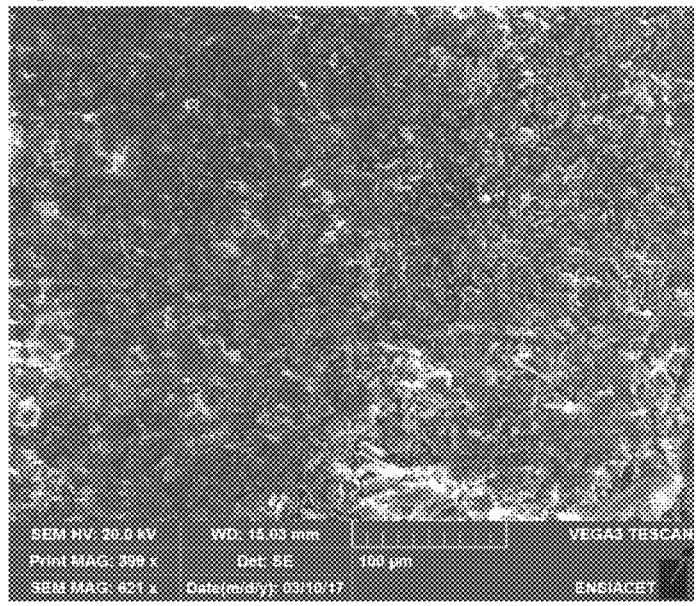
FIG. 1 is a SEM image (magnification ×621) of a PVB sample before treatment.
Figure 2:
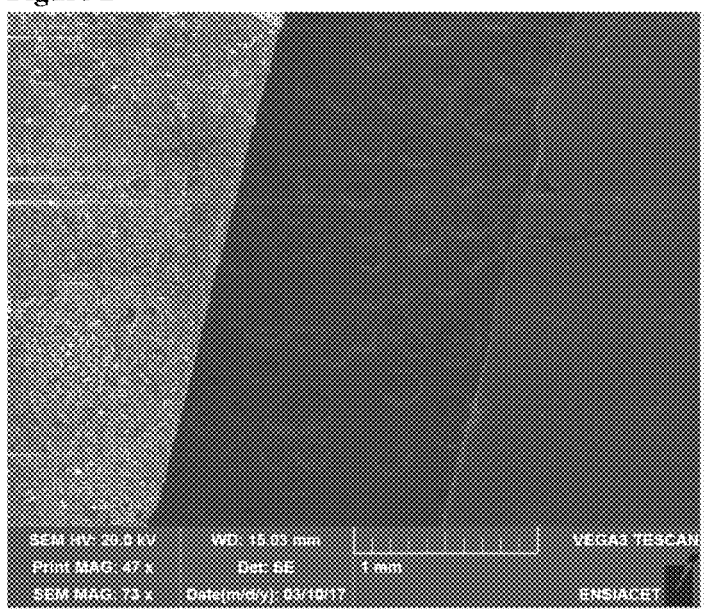
FIG. 2 is a SEM image (magnification ×73) of a PVB sample before (left) and after treatment (right) deposited on the same stub (covered with carbon adhesive, in the center)
Figure 3:
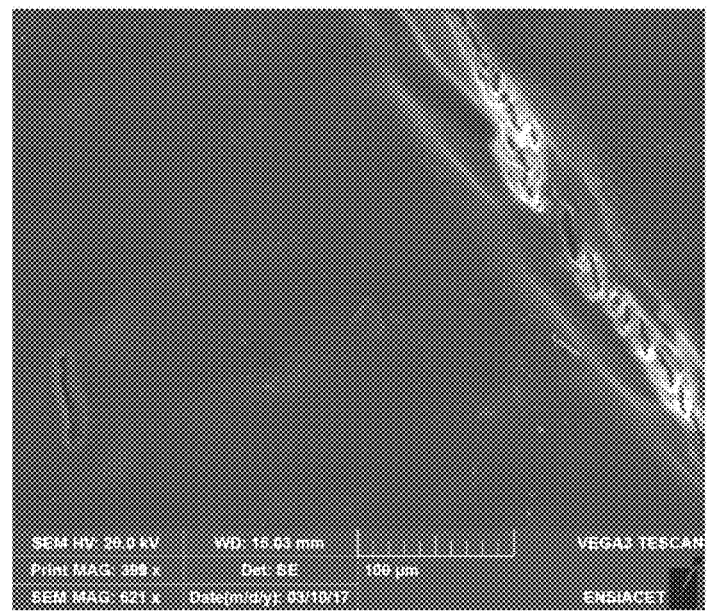
FIG. 3 is a SEM image (magnification ×621) of a PVB sample after treatment.

One hundred grams of pieces of PVB sheets obtained from crushing laminated glass (PVB fragments) are immersed in an aqueous solution 1 liter in volume comprising 53 grams sodium carbonate (0.5 mol) and 0.655 g cationic surfactant (0.0018 mol cetrimonium bromide close to its critical micelle concentration at the treatment temperature). The mixture is subjected to ultrasound produced by an Elmasonic P30H tank with an ultrasonic power of 100 Watts delivered at a frequency of 80 kHz, for 1.5 hours. The temperature of the reaction medium stabilizes between 55 and 58° C. A conventional mechanical stirring device ensures dispersion of the PVB fragments in the medium.

When stopped, the pieces of treated plastic (PVB) settle and are collected, then are rinsed with water and air dried.

Measurement of the Residual Glass Content:

Estimation by counting glass shards under an optical microscope and analysis of the silicon content by EDX probe reveal a residual glass content of less than 30 milligrams per square meter of PVB.

EXAMPLE 2

One hundred grams of pieces of PVB sheets obtained from crushing laminated glass (PVB fragments) are immersed in an aqueous solution 1 liter in volume comprising 69 grams potassium carbonate (0.5 mol) and 2 g cationic surfactant (0.0063 mol cetrimonium chloride close to its critical micelle concentration at the treatment temperature). The mixture is subjected to ultrasound produced by an Elmasonic P30H tank with an ultrasonic power of 120 Watts delivered at a frequency of 37 kHz, for 1.5 hours. The temperature of the reaction medium stabilizes between 55 and 58° C. A conventional mechanical stirring device ensures dispersion of the PVB fragments in the bath.

When stopped, the pieces of treated plastic (PVB) settle and are collected, then are rinsed with water and air dried.

Measurement of the Residual Glass Content:

Estimation by counting glass shards under an optical microscope and analysis of the silicon content by EDX probe reveal a residual glass content of around 50 milligrams per square meter of PVB.

EXAMPLE 3

One hundred grams of pieces of PVB sheets obtained from crushing laminated glass (PVB fragments) are immersed in an aqueous solution 1 liter in volume comprising 53 grams sodium carbonate (0.5 mol) and 0.655 g cationic surfactant (0.0018 mol cetrimonium bromide close to its critical micelle concentration at the treatment temperature). The mixture is subjected to ultrasound produced by an Elmasonic P30H tank with an ultrasonic power of 120 Watts delivered at a frequency of 37 kHz, for 0.5 hours in the water-filled tank. The ultrasound frequency is then changed to the value of 80 kHz for 0.5 hour at the ultrasonic power of 100 Watts. The temperature of the reaction medium stabilizes between 55 and 58° C. A conventional mechanical stirring device ensures dispersion of the PVB fragments in the bath throughout the operation.

When stopped, the pieces of treated plastic (PVB) settle and are collected, then are rinsed with water and air dried.

Measurement of the Residual Glass Content:

Estimation by counting glass shards under an optical microscope and analysis of the silicon content by EDX probe reveal a residual glass content of less than 30 milligrams per square meter of PVB.

COMPARATIVE EXAMPLES

For comparative purposes, various tests were carried out according to the protocol of Examples 1 or 2 or 3 while varying the nature of the surfactant and of the base, their presence or absence, the frequency of the ultrasound, and the temperature of the reaction medium.

The results are presented in Table 1.

Results:

TABLE 1

| | Surfactant | Base | Ultrasound | Conditions | Analysis |
| --- | --- | --- | --- | --- | --- |
| Example 1 | Cetrimonium bromide | $Na_2CO_3$ | 100 Watts at 80 kHz | | <30 mg glass/$m^2$ PVB |
| Example 2 | Cetrimonium chloride | $K_2CO_3$ | 120 Watts at 37 kHz | | about 50 mg glass/$m^2$ PVB |
| Example 3 | Cetrimonium bromide | $Na_2CO_3$ | 120 Watts at 37 kHz then at 80 kHz | | <30 mg glass/$m^2$ PVB |
| Comparative example 1 | None | $Na_2CO_3$ | 100 Watts at 80 kHz | According to protocol of Example 1 without addition of surfactant | 0.8 to 1.6 g glass/$m^2$ PVB |
| Comparative example 2 | Cetrimonium chloride | $K_2CO_3$ | No ultrasound | According to protocol of Example 2 without ultrasound | 1 to 2 g glass/$m^2$ PVB |
| Comparative example 3 | Cetrimonium bromide | None | 100 Watts at 80 kHz | According to protocol of Example 1 without addition of base | 0.8 to 1.6 g glass/$m^2$ PVB |
| Comparative example 4 | Non-ionic surfactant Triton TX100 | $K_2CO_3$ | 120 Watts at 37 kHz | According to protocol of Example 2 | 2 g glass/$m^2$ PVB |
| Comparative example 5 | Anionic surfactant SDS | $K_2CO_3$ | 120 Watts at 37 kHz then at 80 kHz | According to protocol of Example 3 | 0.3 to 0.8 g glass/$m^2$ PVB |
| Comparative example 6 | Cetrimonium bromide | $Na_2CO_3$ | 120 Watts at 37 kHz then at 80 kHz | According to protocol of Example 3 but with the temp of the reaction medium stabilized between 35 and 38° C. | 3 to 5 g glass/$m^2$ PVB |

CONCLUSION

The detachment of glass shards carried out in the absence of one of the four factors (base, cationic surfactant, ultrasound, and temperature) led to unsatisfactory results.

In particular, outside the claimed temperature ranges, the separation of glass shards and PVB is not satisfactory. Similarly, the use of an anionic or non-ionic surfactant does not allow satisfactory results to be obtained.

It is undoubtedly the combination of the four factors acting together that produces a significant effect in terms of extraction/detachment of glass shards from the surface of the PVB.

The invention claimed is:

1. Method for treating fragments of polyvinyl butyral (PVB) having glass shards in or on the surface of the PVB, the method comprising the following steps:
bringing the PVB fragments into contact with an aqueous solution comprising a cationic surfactant and a weak base, to obtain a mixture,
subjecting said mixture to ultrasound, and
separating the glass shards and the PVB,
the temperature of the mixture subjected to ultrasound being between 40 and 70° C.

2. Method according to claim 1, further comprising a step of separating:
a) said aqueous solution comprising a cationic surfactant and a weak base,
b) the glass shards, and
c) the PVB.

3. Method according to claim 2, wherein the separation step is carried out by filtration, sedimentation, decantation, or centrifugation.

4. Method according to claim 1, further comprising, after the step of subjecting the mixture to ultrasound, a step of rinsing the PVB with water and air drying the PVB.

5. Method according to claim 1, wherein the weak base has the following general formula:

$$M_2CO_3, \qquad \text{Formula (I):}$$

where M represents an alkali metal.

6. Method according to claim 5, wherein the weak base is potassium carbonate or sodium carbonate.

7. Method according to claim 1, wherein said aqueous solution comprising a cationic surfactant and a weak base has a basic pH of between 8 and 14.

8. Method according to claim 1, wherein the temperature of the mixture subjected to ultrasound is between 45 and 65° C.

9. Method according to claim 1, wherein the cationic surfactant is a quaternary ammonium halide salt.

10. Method according to claim 9, wherein the cationic surfactant is a quaternary ammonium salt corresponding to the following general formula (II):

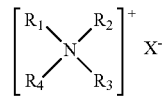

where $R_1$ to $R_3$ each represent a methyl group, $R_4$ represents a linear or branched alkyl chain, and where X represents a halide.

11. Method according to claim 1, wherein the cationic surfactant has an HLB between 20 and 25.

12. Method according to claim 1, wherein the cationic surfactant is a cetyltrimethylammonium halide salt.

13. Method according to claim 7, wherein the basic pH is between 11 and 13.

14. Method according to claim 8 wherein the temperature is between 50 and 60° C.

15. Method according to claim 8 wherein the temperature is between 55 and 58° C.

16. Method according to claim 10 wherein $R_4$ represents a linear alkyl chain.

17. Method according to claim 16 wherein the linear alkyl chain comprises from 8 and 30 carbon atoms.

18. Method according to claim 16 wherein the linear alkyl chain comprises, from 10 and 24 carbon atoms.

19. Method according to claim 16 wherein the linear alkyl chain comprises from 10 and 18 carbon atoms.

20. Method according to claim 1 wherein the matrix of the PVB or the mechanical properties of the PVB are not degraded by the method.

* * * * *